(12) United States Patent
Jain et al.

(10) Patent No.: US 11,763,479 B2
(45) Date of Patent: Sep. 19, 2023

(54) AUTOMATIC MEASUREMENTS BASED ON OBJECT CLASSIFICATION

(71) Applicant: Apple Inc., Cupertino, CA (US)

(72) Inventors: Amit Jain, San Francisco, CA (US); Aditya Sankar, Seattle, WA (US); Qi Shan, Mercer Island, WA (US); Alexandre Da Veiga, San Francisco, CA (US); Shreyas V. Joshi, Seattle, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/072,855

(22) Filed: Dec. 1, 2022

(65) Prior Publication Data

US 2023/0094061 A1   Mar. 30, 2023

Related U.S. Application Data

(63) Continuation of application No. 17/148,965, filed on Jan. 14, 2021, now Pat. No. 11,574,485.
(Continued)

(51) Int. Cl.
*G06T 7/62* (2017.01)
*G06T 7/60* (2017.01)
(Continued)

(52) U.S. Cl.
CPC .............. *G06T 7/62* (2017.01); *G06F 18/241* (2023.01); *G06T 7/60* (2013.01); *G06V 10/22* (2022.01);
(Continued)

(58) Field of Classification Search
CPC ...... G06V 20/64; G06V 10/22; G06V 10/454; G06V 10/764; G06V 10/803; G06V 10/82;
(Continued)

(56) References Cited

U.S. PATENT DOCUMENTS

| | | | |
|---|---|---|---|
| 5,864,635 A  * | 1/1999 | Zetts | G06F 3/04883 382/229 |
| 9,183,664 B2 | 11/2015 | Schreyer et al. | |

(Continued)

FOREIGN PATENT DOCUMENTS

| | | |
|---|---|---|
| CN | 106688011 | 5/2017 |
| CN | 108121997 | 6/2018 |

(Continued)

OTHER PUBLICATIONS

Sim, Daniel, "Real-Time 3D Reconstruction and Semantic Segmentation Using Multi-Layer Heightmaps", Master Thesis; Sep. 2, 2015; pp. 1-73.

(Continued)

*Primary Examiner* — Xuemei G Chen
(74) *Attorney, Agent, or Firm* — Thompson Hine LLP

(57) ABSTRACT

Various implementations disclosed herein include devices, systems, and methods that provide measurements of objects based on a location of a surface of the objects. An exemplary process may include obtaining a three-dimensional (3D) representation of a physical environment that was generated based on depth data and light intensity image data, generating a 3D bounding box corresponding to an object in the physical environment based on the 3D representation, determining a class of the object based on the 3D semantic data, determining a location of a surface of the object based on the class of the object, the location determined by identifying a plane within the 3D bounding box having semantics in the 3D semantic data satisfying surface criteria for the object, and providing a measurement of the object, the measurement of the object determined based on the location of the surface of the object.

21 Claims, 8 Drawing Sheets

Related U.S. Application Data

(60) Provisional application No. 62/962,494, filed on Jan. 17, 2020.

(51) Int. Cl.
*G06V 20/64* (2022.01)
*G06F 18/241* (2023.01)
*G06V 10/764* (2022.01)
*G06V 10/80* (2022.01)
*G06V 10/82* (2022.01)
*G06V 10/70* (2022.01)
*G06V 10/44* (2022.01)
*G06V 20/00* (2022.01)
*G06V 10/22* (2022.01)

(52) U.S. Cl.
CPC .......... *G06V 10/454* (2022.01); *G06V 10/764* (2022.01); *G06V 10/803* (2022.01); *G06V 10/82* (2022.01); *G06V 10/87* (2022.01); *G06V 20/00* (2022.01); *G06V 20/64* (2022.01); *G06T 2207/10028* (2013.01); *G06T 2207/20081* (2013.01); *G06T 2207/20084* (2013.01)

(58) Field of Classification Search
CPC ...... G06V 10/87; G06V 20/00; G06F 18/241; G06F 18/2431; G06F 18/251; G06F 18/285; G06T 7/60; G06T 2207/10028; G06T 2207/20081; G06T 2207/20084; G06T 7/62; G06T 2207/10004; G06T 2207/10016; G06T 2207/10024; G06T 2207/20072; G06T 2207/20221; G06T 7/521; G06T 7/579; G06T 7/70; G06N 3/045; G06N 3/08
See application file for complete search history.

(56) References Cited

U.S. PATENT DOCUMENTS

| | | | |
|---|---|---|---|
| 9,989,353 | B2 | 6/2018 | Bartmann et al. |
| 10,169,680 | B1* | 1/2019 | Sachdeva ............... G06N 3/045 |
| 10,289,925 | B2 | 5/2019 | Farooqi et al. |
| 10,304,191 | B1 | 5/2019 | Mousavian et al. |
| 10,373,380 | B2 | 8/2019 | Kutliroff et al. |
| 10,482,674 | B1* | 11/2019 | Wu ........................ G09B 25/00 |
| 10,650,261 | B2 | 5/2020 | Feng |
| 10,740,606 | B2 | 8/2020 | Metzler et al. |
| 2016/0133026 | A1* | 5/2016 | Patel ......................... G06T 7/62 382/154 |
| 2016/0189419 | A1 | 6/2016 | Fakih et al. |
| 2018/0150713 | A1 | 5/2018 | Farooqi et al. |
| 2019/0038181 | A1 | 2/2019 | Domeika et al. |
| 2019/0148011 | A1 | 5/2019 | Rao et al. |
| 2019/0178643 | A1 | 6/2019 | Metzler et al. |
| 2019/0209116 | A1 | 7/2019 | Sjostrand et al. |
| 2019/0272411 | A1* | 9/2019 | Zou ............... G06T 7/10 |
| 2019/0331768 | A1* | 10/2019 | Harrison ............... G06F 18/217 |
| 2019/0385026 | A1* | 12/2019 | Richeimer ............. G06V 20/41 |
| 2019/0392630 | A1 | 12/2019 | Sturm et al. |
| 2020/0043186 | A1* | 2/2020 | Selviah ...................... G06T 7/33 |
| 2020/0081979 | A1* | 3/2020 | Gauderis ................. G06F 40/30 |
| 2020/0134372 | A1 | 4/2020 | Roy Chowdhury et al. |
| 2020/0324781 | A1* | 10/2020 | Hayakawa ............. G06V 20/56 |
| 2020/0349351 | A1* | 11/2020 | Brook .................... G06V 20/20 |
| 2020/0356718 | A1 | 11/2020 | Chu et al. |
| 2020/0398495 | A1* | 12/2020 | Roca ...................... G06N 20/10 |
| 2021/0027471 | A1 | 1/2021 | Cohen et al. |
| 2021/0073945 | A1 | 3/2021 | Kim et al. |
| 2021/0082118 | A1 | 3/2021 | Zhang et al. |
| 2021/0150755 | A1 | 5/2021 | Gao et al. |
| 2021/0174151 | A1 | 6/2021 | Paula et al. |
| 2021/0174519 | A1 | 6/2021 | Bazarevsky et al. |
| 2021/0183158 | A1* | 6/2021 | Korngold ............ G06F 3/04815 |
| 2021/0319582 | A1* | 10/2021 | Sangeneni ............. G06Q 50/28 |
| 2022/0108528 | A1* | 4/2022 | Feng ........................ G06T 3/40 |

FOREIGN PATENT DOCUMENTS

| | | |
|---|---|---|
| CN | 108241870 | 7/2018 |
| CN | 109325933 | 2/2019 |
| KR | 20190110965 | 10/2019 |
| WO | 2016037300 | 3/2016 |

OTHER PUBLICATIONS

Rosebrock, Adrian, "Measuring Size of Objects in an Image with OpenCV", PYImagesearch; Mar. 28, 2016, Image Processing, Tutorials, pp. 1-11.

Mousavian, Arsalan, Anguelov, Dragomir, Flynn, John; Koescka, Jana; "3D Bounding Box Estimation Using Deep Learning and Geometry", arXiv:1612.00496v2 [cs.CV] Apr. 10, 2017, pp. 1-10.

China National Intellectual Property Administration, Patent Search Report (with English translation), Chinese Patent Application No. 202110053465.3, 6 pages, dated Aug. 29, 2022.

\* cited by examiner

AUTOMATIC MEASUREMENTS BASED ON OBJECT CLASSIFICATION

CROSS-REFERENCE TO RELATED APPLICATIONS

This application is a continuation application of U.S. application Ser. No. 17/148,965 filed Jan. 14, 2021, which claims the benefit of U.S. Provisional Application Ser. No. 62/962,494 filed Jan. 17, 2020, each of which is incorporated by reference herein in its entirety.

TECHNICAL FIELD

The present disclosure generally relates to generating geometric representations of objects in physical environments, and in particular, to systems, methods, and that generate geometric representations based on information detected in physical environments.

BACKGROUND

Object detection and accurate measurements of objects play an important role in designing, understanding, and remodeling indoor spaces and generating accurate reconstructions. There are numerous hurdles to providing computer-based systems to automatically generate object measurements based on sensor data. The sensor data obtained regarding a physical environment (e.g., images and depth data) may be incomplete or insufficient to provide accurate measurements. As another example, images and depth data typically lacks semantic information and measurements generated without such data may lack accuracy. Existing techniques do not allow for automatic, accurate, and efficient generation object measurements using a mobile device, for example, based on a user capturing photos or video or other sensor data while walking about in a room. Moreover, existing techniques may fail to provide sufficiently accurate and efficient measurements in real time (e.g., immediate measurement during scanning) environments.

SUMMARY

Various implementations disclosed herein include devices, systems, and methods that generate measurements using three-dimensional (3D) representations of a physical environment. The 3D representations of the physical environment may be generated based on sensor data, such as image and depth sensor data. The generation of object detection and object measurements is facilitated in some implementations using semantically-labelled 3D representations of a physical environment. Some implementations perform semantic segmentation and labeling of 3D point clouds of a physical environment.

According to some implementations, measurements of objects (e.g., furniture, appliances, etc.) detected in a physical environment may be generated using multiple, different techniques. In some implementations, an object is measured by first generating a 3D bounding box for the object based on the depth data, refining the bounding box using various neural networks and refining algorithms described herein, and acquiring measurements based on the refined bounding box and the associated 3D data points for the respective bounding box. In some implementations, an object is measured using different types of measurements for different object types using machine learning techniques (e.g., neural networks). For example, different types of measurements may include a seat height for chairs, a display diameter for TVs, a table diameter for round tables, a table length for rectangular tables, and the like.

Some implementations disclosed herein may achieve various advantages by measuring an object using multiple, class-specific machine learning models (e.g., class specific neural networks). In some implementations, multiple machine learning models are trained to determine different measurements for different object classes. For example, one model may be trained and used to determine measurements for chair type objects (e.g., determining a seat height, arm length, etc.) and another model may be trained and used to determine measurements for TV type objects (e.g., determining a diagonal screen size, greatest TV depth, etc.). Such class-specific measurements may provide more information than the simple length, width, and height of the bounding boxes that may be identified for each object.

In some implementations, an auto-measure technique uses slices or horizontal planes to identify surfaces (e.g., a seat top) and uses those detected surfaces to provide measurements (e.g., distance of the seat to the ground).

Some implementations involve an exemplary method of providing a measurement for an object within a physical environment. The exemplary method involves obtaining a 3D representation of a physical environment that was generated based on depth data and light intensity image data. For example, a 3D point cloud may be generated based on depth camera information received concurrently with light intensity images. In some implementations, the 3D representation may be associated with 3D semantic data. For example, an algorithm may perform semantic segmentation and labeling of 3D point clouds points.

The exemplary method further involves generating a 3D bounding box corresponding to objects in the physical environment based on the 3D representation. For example, the 3D bounding box may provide location, pose (e.g., orientation and location), and shape of each piece furniture and appliance in a room or portion of a room. A 3D bounding box may be refined using an inflate and cut technique. In some implementations, generating a refined 3D bounding box includes generating a proposed 3D bounding box for an object using a first neural network and generating a refined 3D bounding box by inflating the proposed 3D bounding box based on a bounding box inflation scale (e.g., inflate the bounding box by 10%), identifying features of the object of the inflated proposed bounding box using a second neural network, and refining the proposed 3D bounding box based on the identified features. In some implementations, the first neural network generates the proposed bounding box based on the 3D semantic data associated with the object. In some implementations, the second neural network identifies the features of the object based on the 3D semantic data associated with the object. In some implementations, a third neural network is trained to refine the accuracy of the identified features from the second neural network based on the 3D semantic data associated with the object and light intensity image data (e.g., RGB data) obtained during the scanning process, and output a further refined 3D bounding box based on the refined accuracy of the identified features.

The exemplary method further involves classifying the objects based on the 3D bounding box and the 3D semantic data. For example, providing a class designation or label for each generated 3D bounding box. In some implementations, classifying an object based on the 3D bounding box and the 3D semantic data includes determining, based on the 3D semantic data, a class of the 3D bounding box using an object classification neural network, and classifying the object corresponding to the 3D bounding box based on the classification of the 3D bounding box. In some implementations, a first class-specific neural network is trained to determine specific points on a first classification of objects (e.g., chairs) that are used for measurements of objects in the first classification. For example, an arm length and a seat height of a chair could be determined. In some implementations, a second class-specific neural network is trained to determine specific points on a second classification of objects (e.g., tables) that are used for measurements of objects in the second classification, wherein the second classification of objects is different than the first classification of objects. For example, table height, table top dimensions specific to round or rectangular table tops. The measurements of objects in the second classification of objects are different than the measurements of objects in the first classification of objects. For example, a chair may include more or at least different measurements than a table or a TV.

The exemplary method further involves displaying a measurement (e.g., arm length, seat height, TV diameter, etc.) of the object, where the measurement of the object is determined using one of a plurality of class-specific neural networks selected based on the classifying of the object. For example, a first network is trained to determine specific points on a chair that are used for chair measurements, and a second network trained to determine different points on tables that are used for table measurements. In use, a user may scan a room with a device (e.g., a smartphone) and the processes described herein would identify an object (e.g., a chair), and provide specific measurements for the object (e.g., chair height, seat height, based width, etc.). In some implementations, the measurements may be automatically displayed on the user device overlaid or next to the object. In some implementations, the measurements may be provided after some type of user interaction with the identified object. For example, the user may be shown a transparent bounding box surrounding an object, and the user may select or click on the bounding box and the measurements would then be displayed.

In some implementations, the 3D representation is associated with 3D semantic data that includes a 3D point cloud that includes semantic labels associated with at least a portion of 3D points within the 3D point cloud. Additionally, in some implementations, the semantic labels identify walls, wall attributes (e.g., doors and windows), objects, and classifications of the objects of the physical environment.

Some implementations of this disclosure involve an exemplary method of providing measurement data for an object within a physical environment. The exemplary method first involves obtaining a 3D representation of a physical environment that was generated based on depth data and light intensity image data. For example, a 3D point cloud may be generated based on depth camera information received concurrently with the images. In some implementations, the 3D representation is associated with 3D semantic data. For example, algorithms may be used for semantic segmentation and labeling of 3D point clouds of indoor scenes.

The exemplary method further involves generating a 3D bounding box corresponding to an object in the physical environment based on the 3D representation. For example, a 3D bounding box may provide location, pose (e.g., orientation and location), and shape of each piece furniture and appliance in the room. Bounding boxes may be refined using an inflate and cut technique. In some implementations, generating a refined 3D bounding box includes generating a proposed 3D bounding box for an object using a first neural network and generating the refined 3D bounding box by inflating the proposed 3D bounding box based on a bounding box inflation scale (e.g., inflate the bounding box by 10%), identifying features of the object of the inflated proposed 3D bounding box using a second neural network, and refining the proposed 3D bounding box based on the identified features. In some implementations, the first neural network generates the proposed 3D bounding box based on the 3D semantic data associated with the object. In some implementations, the second neural network identifies the features of the object based on the 3D semantic data associated with the object. In some implementations, a third neural network is trained to refine the accuracy of the identified features from the second neural network based on the 3D semantic data associated with the object and light intensity image data (e.g., RGB data) obtained during the scanning process, and output a further refined 3D bounding box based on the refined accuracy of the identified features.

The exemplary method further involves determining a class of the object based on the 3D semantic data. For example, providing a class designation or label for the generated 3D bounding box. In some implementations, classifying an object based on the 3D semantic data includes determining, based on the 3D semantic data, a class of the object using an object classification neural network, and classifying the 3D bounding box corresponding to the object based on the determined class of the object. In some implementations, a first class-specific neural network is trained to determine specific points on a first classification of objects (e.g., chairs) that are used for measurements of objects in the first classification. For example, arm length and seat height of a chair. In some implementations, a second class-specific neural network is trained to determine specific points on a second classification of objects (e.g., tables) that are used for measurements of objects in the second classification, wherein the second classification of objects is different than the first classification of objects. For example, for tables the table height and table top dimensions specific to round or rectangular table tops. The measurements of objects in the second classification of objects are different than the measurements of objects in the first classification of objects. For example, a chair may include more or at least different measurements than a table or a TV.

The exemplary method further involves determining a location of a surface of the object based on the class of the object. The location is determined by identifying a plane within the 3D bounding box having semantics in the 3D semantic data satisfying surface criteria for the object. For example, identifying that a large number of chair voxels are within a horizontal plane indicates that the plane is the seat surface of a chair type object.

The exemplary method further involves providing a measurement (e.g., seat height, etc.) of the object. The measurement of the object is determined based on the location of the surface of the object. For example, measurements may be acquired from the seat surface to the floor to provide a seat height measurement. For example, a user may scan a room with a device (e.g., a smartphone) and the processes described herein would identify an object (e.g., a chair), and provide measurements for the identified object (e.g., seat height, etc.). In some implementations, the measurements may be automatically displayed on the user device overlaid or next to the object. In some implementations, the measurements may be provided after some type of user interaction with the identified object. For example, the user may be shown a transparent bounding box surrounding an object, and the user may select or click on the bounding box and the measurements would then be displayed.

In some implementations, identifying a plane within a bounding box includes identifying that a number of 3D data points (e.g., voxels) are within a particular plane (e.g., horizontal) indicates that the plane is a surface of a particular feature (e.g., chair seat) of a type of the object.

In some implementations, the number of 3D data points that are within the particular plane that indicates that the plane is the surface of the particular feature of the type of the object is determined based on a comparison to a data point plane threshold. For example, a plane threshold is a particular number of data points. In some implementations, a plane threshold is a percentage of data points compared to the other data points that are semantically labeled. For example, if 30% or more points are on the same horizontal plane (i.e., same height level), then it can be determined that a detected horizontal plane is the seat of a chair. In some implementations, different threshold percentages could be used for other object classifications. For example, tables would have a higher percentage of data points on the same horizontal plane. In some implementations, different detected planes may be used and compared to determine different features of identified objects.

In some implementations, the 3D representation is associated with 3D semantic data that includes a 3D point cloud that includes semantic labels associated with at least a portion of 3D points within the 3D point cloud. Additionally, in some implementations, the semantic labels identify walls, wall attributes (e.g., doors and windows), objects, and classifications of the objects of the physical environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
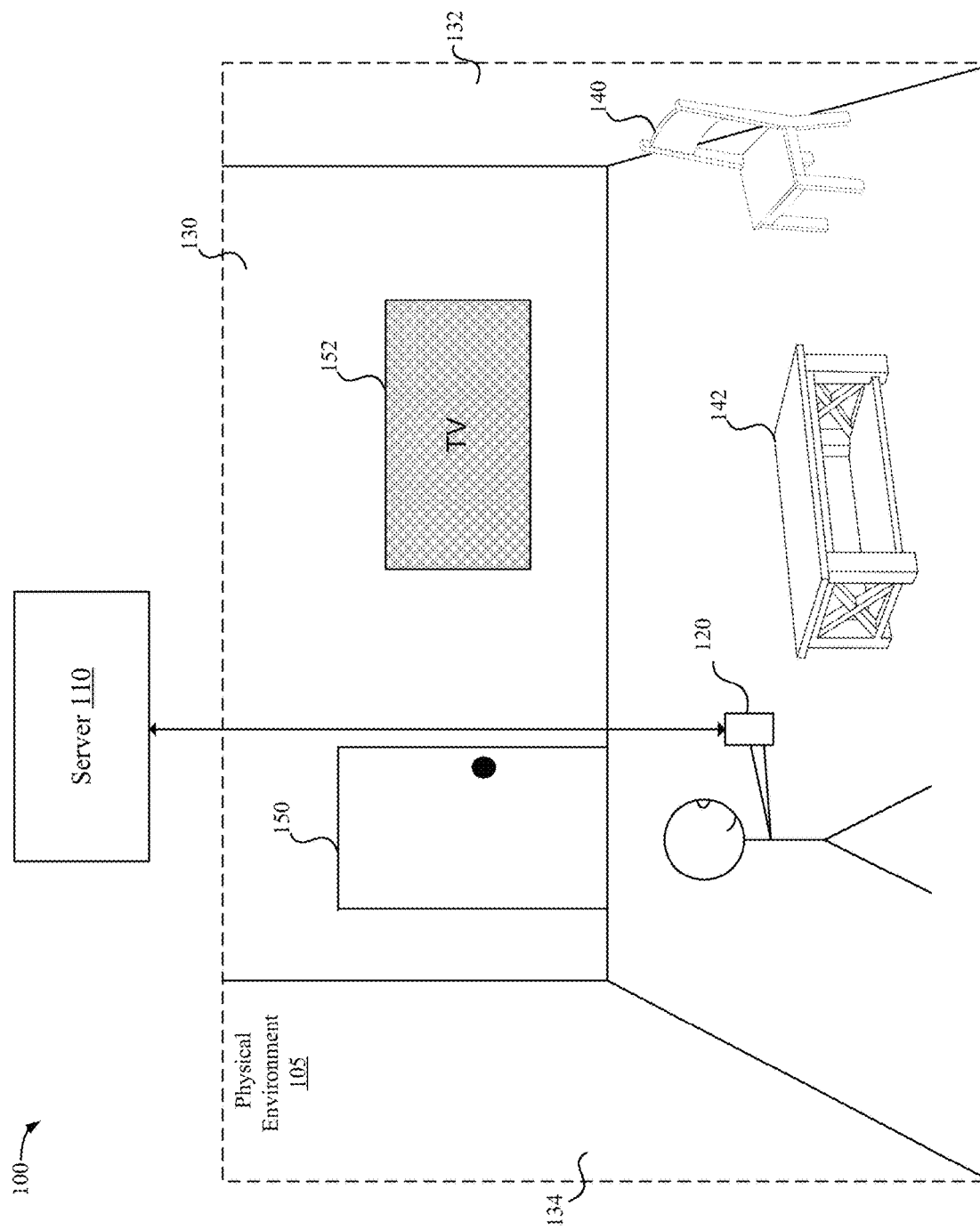
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. In this example, the example operating environment 100 illustrates an example physical environment 105 that includes walls 130, 132, 134, chair 140, table 142, door 150, and TV 152. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a server 110 and a device 120. In an exemplary implementation, the operating environment 100 does not include a server 110, and the methods described herein are performed on the device 120.

In some implementations, the server 110 is configured to manage and coordinate an experience for the user. In some implementations, the server 110 includes a suitable combination of software, firmware, and/or hardware. The server 110 is described in greater detail below with respect to FIG. 2. In some implementations, the server 110 is a computing device that is local or remote relative to the physical environment 105. In one example, the server 110 is a local server located within the physical environment 105. In another example, the server 110 is a remote server located outside of the physical environment 105 (e.g., a cloud server, central server, etc.). In some implementations, the server 110 is communicatively coupled with the device 120 via one or more wired or wireless communication channels (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the server 110 are provided by and/or combined with the device 120.

In some implementations, the device 120 is a handheld electronic device (e.g., a smartphone or a tablet) configured to present content to the user. In some implementations, the user wears the device 120 on his/her head. As such, the device 120 may include one or more displays provided to display content. For example, the device 120 may enclose the field-of-view of the user. In some implementations, the device 120 is replaced with a chamber, enclosure, or room configured to present content in which the user does not wear or hold the device 120.

Figure 2:
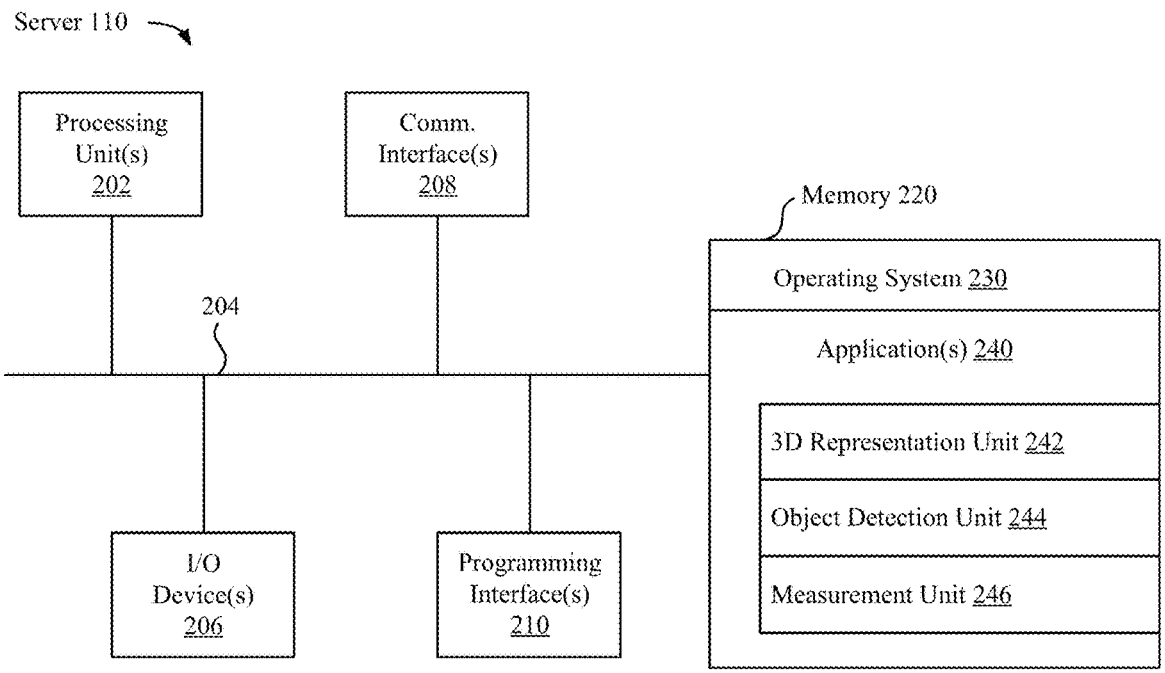
FIG. 2 is a block diagram of an example server in accordance with some implementations.

FIG. 2 is a block diagram of an example of the server 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the server 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the applications 240 are configured to manage and coordinate one or more experiences for one or more users (e.g., a single experience for one or more users, or multiple experiences for respective groups of one or more users).

The applications 240 include a 3D representation unit 242, a object detection unit 244, and a measurement unit 246. The 3D representation unit 242, the object detection unit 244, and the measurement unit 246 can be combined into a single application or unit or separated into one or more additional applications or units.

The 3D representation unit 242 is configured with instructions executable by a processor to obtain image data (e.g., light intensity data, depth data, etc.) and integrate (e.g., fuse) the image data using one or more of the techniques disclosed herein. For example, the 3D representation unit 242 fuses RGB images from a light intensity camera with a sparse depth map from a depth camera (e.g., time-of-flight sensor) and other sources of physical environment information to output a dense depth point cloud of information. Additionally, the 3D representation unit 242 is configured with instructions executable by a processor to obtain light intensity image data (e.g., RGB) and perform a semantic segmentation algorithm to assign semantic labels to recognized features in the image data and generate semantic image data (e.g., RGB-S) using one or more of the techniques disclosed herein. The 3D representation unit 242 is further configured with instructions executable by a processor to obtain light intensity image data (e.g., RGB) and depth image data and generate a semantic 3D representation (e.g., a 3D point cloud with associated semantic labels) using one or more of the techniques disclosed herein. In some implementations, the 3D representation unit 242 includes separate units, such as an integration unit to generate the 3D point cloud data, a semantic unit for semantic segmentation based on light intensity data (e.g., RGB-S), and a semantic 3D unit to generate the semantic 3D representation, as further discussed herein with reference to FIG. 4.

The object detection unit 244 is configured with instructions executable by a processor to generate and display measurements of objects determined using one of a plurality of class-specific neural networks of a physical environment based on a 3D representation (e.g., a 3D point cloud, a 3D mesh reconstruction, a semantic 3D point cloud, etc.) of the physical environment using one or more of the techniques disclosed herein. For example, the object detection unit 244 obtains a sequence of light intensity images from a light intensity camera (e.g., a live camera feed), a semantic 3D representation (e.g., semantic 3D point cloud) generated from the 3D representation unit 242, and other sources of physical environment information (e.g., camera positioning information from a camera's SLAM system). The object detection unit 244 can identify objects (e.g., furniture, appliances, etc.) in the sequence of light intensity images based on the semantic 3D representation, generate bounding boxes for each identified object, and perform post processing using a fine-tuning neural network technique further disclosed herein.

Figure 8:
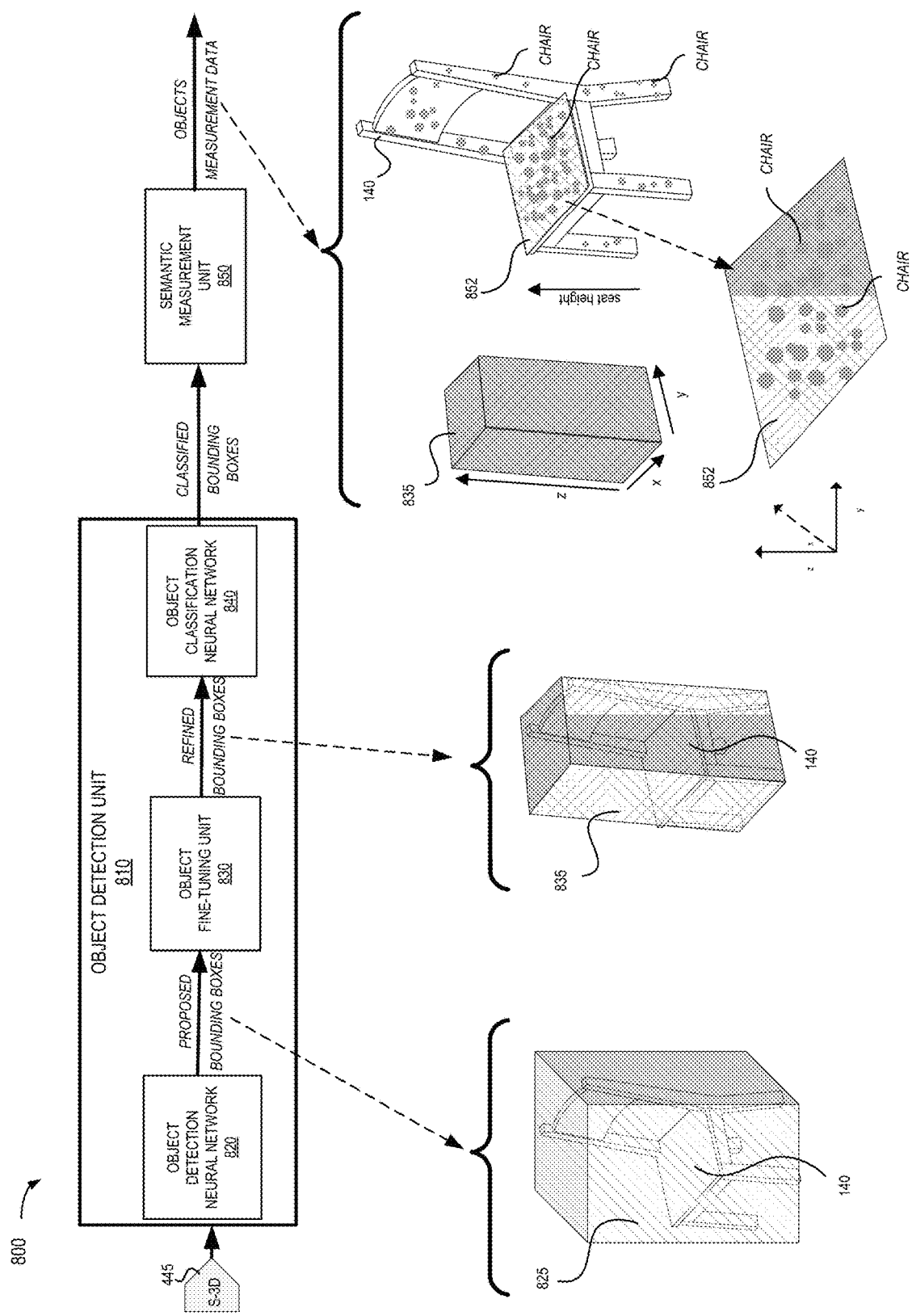
FIG. 8 is a system flow diagram illustrating an example generation of measurements of objects determined based on the location of the surface according to some implementations.

In some implementations, the object detection unit 244 includes separate units, such as an object detection neural network unit to identify objects and generate proposed bounding boxes, an associated post processing unit to fine-tune the bounding boxes for each object identified, and an object classification neural network to classify each type of object, as further discussed herein with reference to FIGS. 6 and 8.

The measurement unit 246 is configured with instructions executable by a processor to generate measurement data based on the 3D representation (e.g., a 3D point cloud, a 3D mesh reconstruction, a semantic 3D point cloud, etc.) for the identified objects using one or more techniques disclosed herein. For example, the measurement unit 246 obtains data associated with bounding boxes (e.g., classified and refined bounding boxes) for identified objects from the object detection unit 244. The measurement unit 246 is configured with instructions executable by a processor to generate and provide measurement data based on the 3D representation for the identified objects using one or more processes further disclosed herein with reference to FIGS. 6 and 8.

In some implementations, the measurement unit 246 includes a plurality of machine learning units for each specific type of object. For example, a class—1 neural network for chairs, a class—2 neural network for tables, a class—3 neural network for TVs, etc. The plurality of machine learning units can be trained for a different subset of objects such that the measurement unit 246 can provided different types of measurements for each subset of object (e.g., diameter for a round table versus length and width of a rectangular table). The measurement unit 246 is configured with instructions executable by a processor to generate and provide measurement data based on the 3D representation for the identified objects for each subset of neural networks for each class of object using one or more processes further disclosed herein with reference to FIG. 6.

In some implementations, the measurement unit 246 includes a plane detection unit for identifying a plane within the bounding box having semantics in the 3D semantic data satisfying surface criteria for the object. For example, identifying that a large number of chair voxels are within a horizontal plane indicates that the plane is the seat surface of a chair type object. The measurement unit 246 is configured with instructions executable by a processor to generate and provide measurement data based on the 3D representation for the identified objects and particular plane detection using one or more processes further disclosed herein with reference to FIG. 8.

Although these elements are shown as residing on a single device (e.g., the server 110), it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
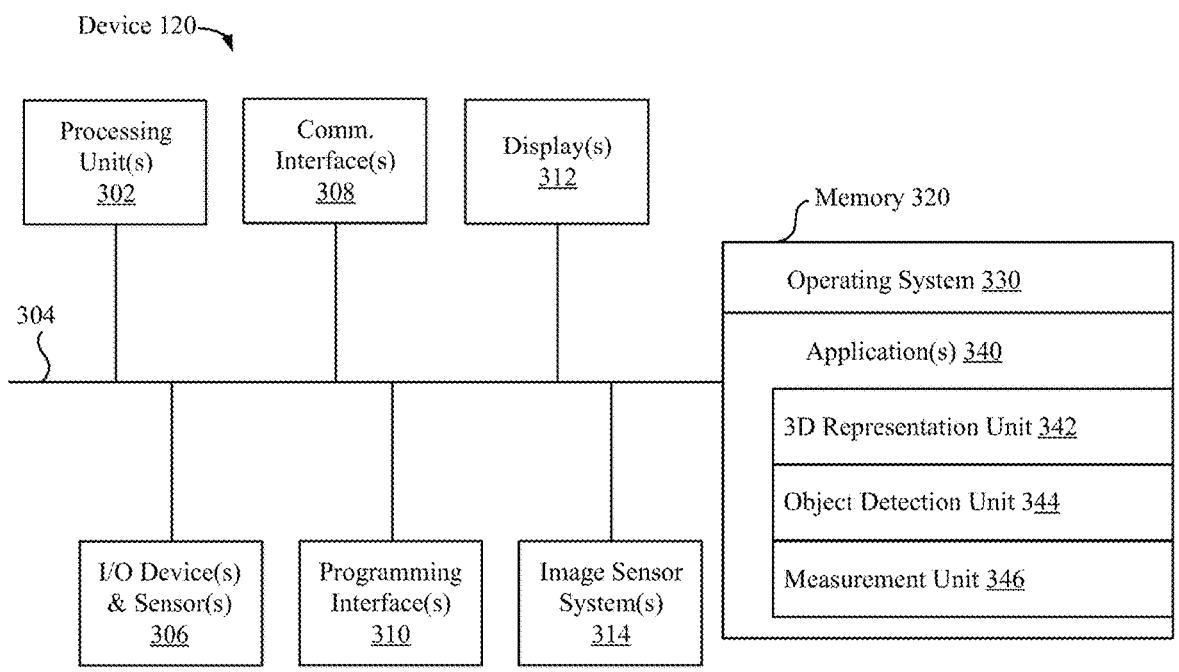
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more ARNR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the applications 340 are configured to manage and coordinate one or more experiences for one or more users (e.g., a single experience for one or more users, or multiple experiences for respective groups of one or more users). The applications 340 include include a 3D representation unit 342, an object detection unit 344, and a measurement unit 346. The 3D representation unit 342, the object detection unit 344, and the measurement unit 346 can be combined into a single application or unit or separated into one or more additional applications or units.

The 3D representation unit 342 is configured with instructions executable by a processor to obtain image data (e.g., light intensity data, depth data, etc.) and integrate (e.g., fuse) the image data using one or more of the techniques disclosed herein. For example, the 3D representation unit 342 fuses RGB images from a light intensity camera with a sparse depth map from a depth camera (e.g., time-of-flight sensor) and other sources of physical environment information to output a dense depth point cloud of information. Additionally, the 3D representation unit 342 is configured with instructions executable by a processor to obtain light intensity image data (e.g., RGB) and perform a semantic segmentation algorithm to assign semantic labels to recognized features in the image data and generate semantic image data (e.g., RGB-S) using one or more of the techniques disclosed herein. The 3D representation unit 342 is further configured with instructions executable by a processor to obtain light intensity image data (e.g., RGB) and depth image data and generate a semantic 3D representation (e.g., a 3D point cloud with associated semantic labels) using one or more of the techniques disclosed herein. In some implementations, the 3D representation unit 342 includes separate units, such as an integration unit to generate the 3D point cloud data, a semantic unit for semantic segmentation based on light intensity data (e.g., RGB-S), and a semantic 3D unit to generate the semantic 3D representation, as further discussed herein with reference to FIG. 4.

The object detection unit 344 is configured with instructions executable by a processor to generate and display measurements of objects determined using one of a plurality of class-specific neural networks of a physical environment based on a 3D representation (e.g., a 3D point cloud, a 3D mesh reconstruction, a semantic 3D point cloud, etc.) of the physical environment using one or more of the techniques disclosed herein. For example, the object detection unit 344 obtains a sequence of light intensity images from a light intensity camera (e.g., a live camera feed), a semantic 3D representation (e.g., semantic 3D point cloud) generated from the 3D representation unit 342, and other sources of physical environment information (e.g., camera positioning information from a camera's SLAM system). The object detection unit 344 can identify objects (e.g., furniture, appliances, etc.) in the sequence of light intensity images based on the semantic 3D representation, generate bounding boxes for each identified object, and perform post processing using a fine-tuning neural network technique further disclosed herein.

In some implementations, the object detection unit 344 includes separate units, such as an object detection neural network unit to identify objects and generate proposed bounding boxes, an associated post processing unit to fine-tune the bounding boxes for each object identified, and an object classification neural network to classify each type of object, as further discussed herein with reference to FIGS. 6 and 8.

The measurement unit 346 is configured with instructions executable by a processor to generate measurement data based on the 3D representation (e.g., a 3D point cloud, a 3D mesh reconstruction, a semantic 3D point cloud, etc.) for the identified objects using one or more techniques disclosed herein. For example, the measurement unit 346 obtains data associated with bounding boxes (e.g., classified and refined bounding boxes) for identified objects from the object detection unit 344. The measurement unit 346 is configured with instructions executable by a processor to generate and provide measurement data based on the 3D representation for the identified objects using one or more processes further disclosed herein with reference to FIGS. 6 and 8.

In some implementations, the measurement unit 346 includes a plurality of machine learning units for each specific type of object. For example, a class—1 neural network for chairs, a class—2 neural network for tables, a class—3 neural network for TVs, etc. The plurality of machine learning units can be trained for a different subset of objects such that the measurement unit 346 can provided different types of measurements for each subset of object (e.g., diameter for a round table versus length and width of a rectangular table). The measurement unit 346 is configured with instructions executable by a processor to generate and provide measurement data based on the 3D representation for the identified objects for each subset of neural networks for each class of object using one or more processes further disclosed herein with reference to FIG. 6.

In some implementations, the measurement unit 346 includes a plane detection unit for identifying a plane within the bounding box having semantics in the 3D semantic data satisfying surface criteria for the object. For example, identifying that a large number of chair voxels are within a horizontal plane indicates that the plane is the seat surface of a chair type object. The measurement unit 346 is configured with instructions executable by a processor to generate and provide measurement data based on the 3D representation for the identified objects and particular plane detection using one or more processes further disclosed herein with reference to FIG. 8.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
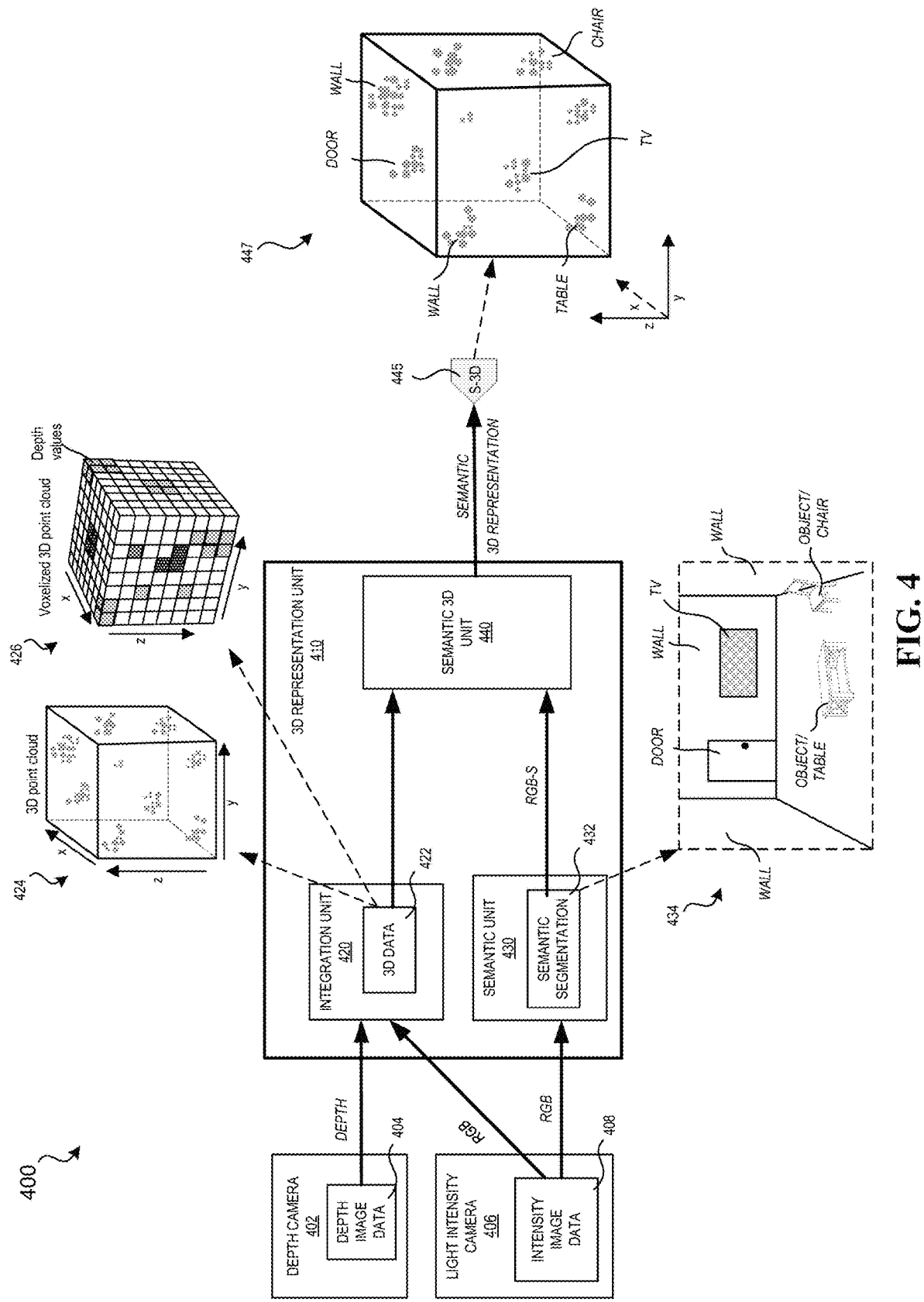
FIG. 4 is a system flow diagram of an example generation of a semantic three-dimensional (3D) representation using 3D data and semantic segmentation based on depth and light intensity image information according to some implementations.

FIG. 4 is a system flow diagram of an example environment 400 in which a system can generate a semantic 3D representation using 3D data and semantic segmentation data based on depth and light intensity image information detected in the physical environment. In some implementations, the system flow of the example environment 400 is performed on a device (e.g., server 110 or device 120 of FIGS. 1-3), such as a mobile device, desktop, laptop, or server device. The system flow of the example environment 400 can be displayed on a device (e.g., device 120 of FIGS. 1 and 3) that has a screen for displaying images and/or a screen for viewing stereoscopic images such as a head-mounted display (HMD). In some implementations, the system flow of the example environment 400 is performed on processing logic, including hardware, firmware, software, or a combination thereof. In some implementations, the system flow of the example environment 400 is performed on a processor executing code stored in a non-transitory computer-readable medium (e.g., a memory).

The system flow of the example environment 400 acquires image data of a physical environment (e.g., the physical environment 105 of FIG. 1) and the 3D representation unit 410 (e.g., 3D representation unit 242 of FIG. 2, and/or 3D representation unit 342 of FIG. 3) generates a semantic 3D representation 445 representing the surfaces in a 3D environment using a 3D point cloud with associated semantic labels. In some implementations, the semantic 3D representation 445 is a 3D reconstruction mesh using a meshing algorithm based on depth information detected in the physical environment that is integrated (e.g., fused) to recreate the physical environment. A meshing algorithm (e.g., a dual marching cubes meshing algorithm, a poisson meshing algorithm, a tetrahedral meshing algorithm, or the like) can be used to generate a mesh representing a room (e.g., physical environment 105) and/or object(s) within a room (e.g., wall 130, door 150, TV 152, chair 140, table 142, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

In an example implementation, the environment 400 includes an image composition pipeline that acquires or obtains data (e.g., image data from image source(s)) for the physical environment. Example environment 400 is an example of acquiring image data (e.g., light intensity data and depth data) for a plurality of image frames. The image source(s) may include a depth camera 402 that acquires depth data 404 of the physical environment, and a light intensity camera 406 (e.g., RGB camera) that acquires light intensity image data 408 (e.g., a sequence of RGB image frames).

The 3D representation unit 410 includes an integration unit 420 that is configured with instructions executable by a processor to obtain the image data (e.g., light intensity data 408, depth data 404, etc.) and integrate (e.g., fuse) the image data using one or more known techniques. For example, the image integration unit 420 receives depth image data 404 and intensity image data 408 from the image sources (e.g., light intensity camera 406 and depth camera 402), and integrates the image data and generates 3D data 422. The 3D data 422 can include a dense 3D point cloud 424 (e.g., imperfect depth maps and camera poses for a plurality of image frames around the object) that is sent to the semantic 3D unit 440. The different size grey dots in the 3D point cloud 424 represent different depth values detected within the depth data. For example, image integration unit 420 fuses RGB images from a light intensity camera with a sparse depth map from a depth camera (e.g., time-of-flight sensor) and other sources of physical environment information to output a dense depth point cloud of information. The 3D data 422 can also be voxelized, as represented by the voxelized 3D point cloud 426, where the different shading on each voxel represents a different depth value.

The 3D representation unit 410 further includes a semantic unit 430 that is configured with instructions executable by a processor to obtain the light intensity image data (e.g., light intensity data 408) and semantically segment wall structures (wall, doors, windows, etc.) and object type (e.g., table, teapot, chair, vase, etc.) using one or more known techniques. For example, the semantic unit 430 receives intensity image data 408 from the image sources (e.g., light intensity camera 406), and generates semantic segmentation data 432 (e.g., RGB-S data). For example, the semantic segmentation 434 illustrates a semantically labelled image of the physical environment 105 in FIG. 1. In some implementations, semantic unit 430 uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

The 3D representation unit 410 further includes a semantic 3D unit 440 that is configured with instructions executable by a processor to obtain the 3D data 422 (e.g., 3D point cloud data 424) from the integration unit 420 and obtain the semantic segmentation data 432 (e.g., RGB-S data) from the semantic unit 430, and generate a semantic 3D representation 445 using one or more techniques. For example, the semantic representation unit 440 generates a semantically labeled 3D point cloud 447 by acquiring the 3D point cloud data 424 and the semantic segmentation 434 using a semantic 3D algorithm that fuses the 3D data and semantic labels. In some implementations, each semantic label includes a confidence value. For example, a particular point may be labeled as an object (e.g., table), and the data point would include x,y,z coordinates and a confidence value as a decimal value (e.g., 0.9 to represent a 90% confidence the semantic label has classified the particular data point correctly). In some implementations, a 3D reconstructed mesh may be generated as the semantic 3D representation 445.

Figure 5:
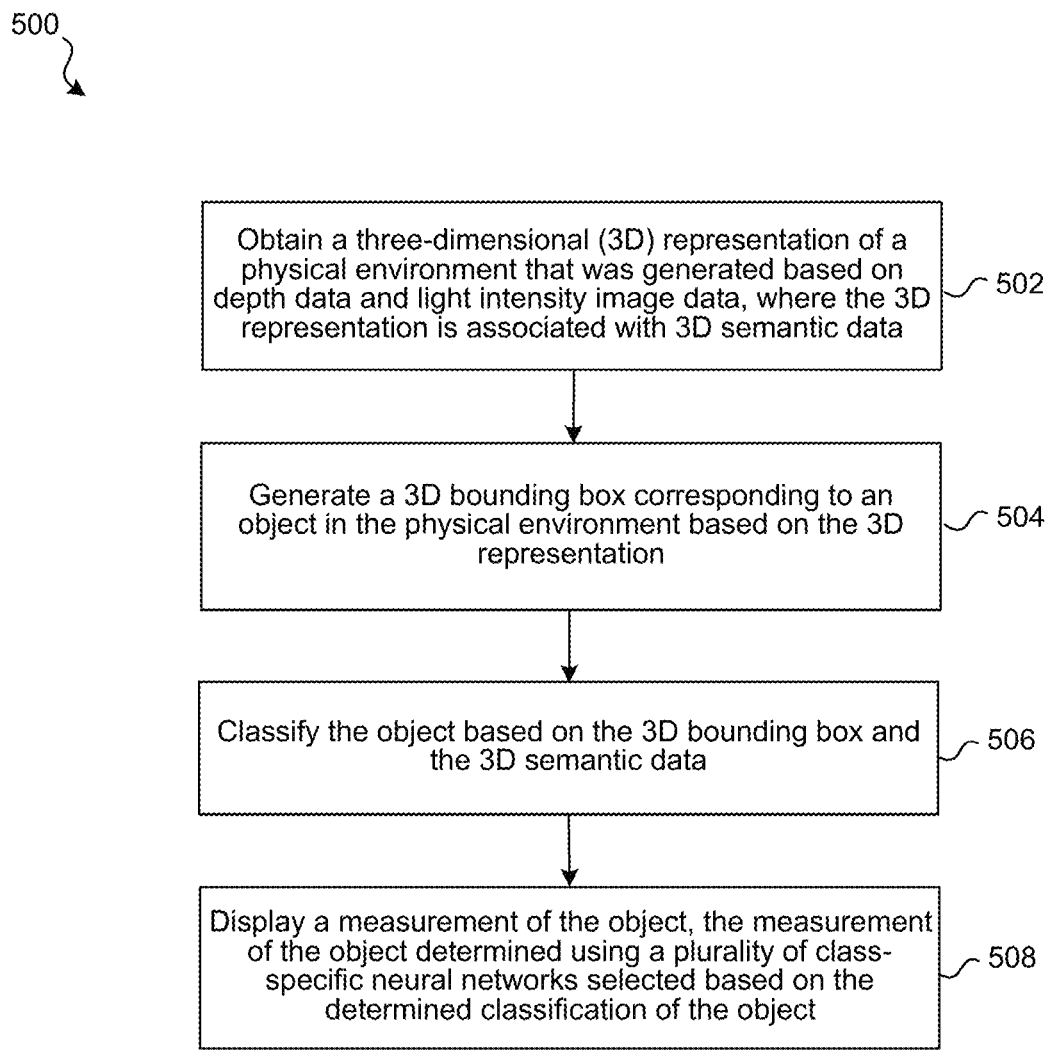
FIG. 5 is a flowchart representation of an exemplary method that generates and displays a measurement of an object determined using a class-specific neural network based on a 3D representation of a physical environment in accordance with some implementations.

FIG. 5 is a flowchart representation of an exemplary method 500 that provides measurement data for objects within a physical environment in accordance with some implementations. In some implementations, the method 500 is performed by a device (e.g., server 110 or device 120 of FIGS. 1-3), such as a mobile device, desktop, laptop, or server device. The method 500 can be performed on a device (e.g., device 120 of FIGS. 1 and 3) that has a screen for displaying images and/or a screen for viewing stereoscopic images such as a head-mounted display (HMD). In some implementations, the method 500 is performed by processing logic, including hardware, firmware, software, or a combination thereof. In some implementations, the method 500 is performed by a processor executing code stored in a non-transitory computer-readable medium (e.g., a memory). The object measurement data creation process of method 500 is illustrated with reference to FIG. 6.

At block 502, the method 500 obtains a 3D representation of a physical environment that was generated based on depth data and light intensity image data. For example, a user captures video while walking around the room to capture images of different parts of the room from multiple perspectives. The depth data can include pixel depth values from a viewpoint and sensor position and orientation data. In some implementations, the depth data is obtained using one or more depth cameras. For example, the one or more depth cameras can acquire depth based on structured light (SL), passive stereo (PS), active stereo (AS), time-of-flight (ToF), and the like. Various techniques may be applied to acquire depth image data to assign each portion (e.g., at a pixel level) of the image. For example, voxel data (e.g., a raster graphic on a 3D grid, with the values of length, width, and depth) may also contain multiple scalar values such as opacity, color, and density. In some implementations, depth data is obtained from sensors or 3D models of the content of an image. Some or all of the content of an image can be based on a real environment, for example, depicting the physical environment 105 around the device 120. Image sensors may capture images of the physical environment 105 for inclusion in the image and depth information about the physical environment 105. In some implementations, a depth sensor on the device 120 (e.g., depth camera 402) determines depth values for voxels that are determined based on images captured by an image sensor on the device 120. The physical environment 105 around the user may be 3D modeled (e.g., 3D point cloud 424) based on one or more values and subsequent depths of objects depicted in subsequent images of the physical environment can be determined based on the model and camera position information (e.g., SLAM information).

At block 504, the method 500 generates a 3D bounding box corresponding to an object in the physical environment based on the 3D representation. For example, the 3D bounding box may provide location, pose (e.g., orientation and location), and shape of each piece furniture and appliance in the room. Bounding boxes may be refined using RGB data and novel multi-network adjustment techniques (e.g., neural network based machine learning techniques for fine-tuning). Bounding boxes may be refined using an inflate and cut technique. In some implementations, generating a refined 3D bounding box includes generating a proposed 3D bounding box for an object using a first neural network and generating the refined 3D bounding box by inflating the proposed 3D bounding box based on a bounding box inflation scale (e.g., inflate the bounding box by 10%), identifying features of the object of the inflated proposed bounding box using a second neural network, and refining the bounding box based on the identified features. In some implementations, the first neural network generates the proposed 3D bounding box based on the 3D semantic data associated with the object. In some implementations, the second neural network identifies the features of the object based on the 3D semantic data associated with the object. In some implementations, a third neural network is trained to refine the accuracy of the identified features from the second neural network based on the 3D semantic data associated with the object and light intensity image data obtained during the scanning process, and output a further refined 3D bounding box based on the refined accuracy of the identified features from the second neural network.

At block 506, the method 500 classifies the object based on the 3D bounding box and the 3D semantic data. For example, providing a class designation or label for each generated 3D bounding box. In some implementations, classifying an object based on the 3D semantic data includes determining, based on the 3D semantic data, a class of the object using an object classification neural network, and classifying the 3D bounding box corresponding to the object based on the determined class of the object. In some implementations, a first class-specific neural network is trained to determine specific points on a first classification of objects (e.g., chairs) that are used for measurements of objects in the first classification. (e.g., arm length and seat height of a chair) In some implementations, a second class-specific neural network is trained to determine specific points on a second classification of objects (e.g., tables) that are used for measurements of objects in the second classification, wherein the second classification of objects is different than the first classification of objects. For example, table height, table top dimensions specific to round or rectangular table tops. The measurements of objects in the second classification of objects are different than the measurements of objects in the first classification of objects. For example, a chair may include more or at least different measurements than a table or a TV.

At block 508, the method 500 displays a measurement (e.g., arm length, seat height, TV diameter, etc.) of the object, where the measurement data of the object is determined using one of a plurality of class-specific neural networks selected based on the classifying of the object. For example, a first network trained to determine specific points on a chair that are used for chair measurements, and a second network trained to determine different points on tables that are used for table measurements. In use, a user may scan a room with a device (e.g., a smartphone) and the processes described herein would identify an object (e.g., a chair), and provide specific measurements for the object (e.g., chair height, seat height, based width, etc.). In some implementations, the measurements may be automatically displayed on the user device overlaid or next to the object. In some implementations, the measurements may be provided after some type of user interaction with the identified object. For example, the user may be shown a transparent bounding box surrounding an object, and the user may select or click on the bounding box and the measurements would then be displayed.

According to some implementations, the 3D bounding box is a refined 3D bounding box, and method 500 further involves generating a refined 3D bounding box for an object by generating a proposed 3D bounding box using a first neural network, and generating the refined 3D bounding box by identifying features of the object using a second neural network (e.g., low precision/high recall to generate features of the object) and refining the proposed 3D bounding box using a third neural network (e.g., high precision/low recall to refine the accuracy of the generated features and output a refined bounding box) based on the identified features. In some implementations, the first neural network generates the proposed 3D bounding box based on the 3D representation associated with the object. In some implementations, the second neural network identifies the features of the object based on the 3D representation associated with the object and light intensity image data (e.g., RGB data) obtained during the scanning process. In some implementations, the third neural network is trained to refine the accuracy of the identified features from the second neural network based on the 3D semantic data associated with the object and light intensity image data obtained during the scanning process, and output a further refined 3D bounding box based on the refined accuracy of the identified features from the second neural network. In some implementations, the 3D bounding box provides location information, pose information (e.g., orientation and location information), and shape information for the objects in the physical environment.

In use, for the process 500, a user may scan a room with a device (e.g., a smartphone) and the processes described herein would identify an object (e.g., a chair), and provide one or more specific measurements for the object (e.g., chair height, seat height, based width, etc.). In some implementations, the measurements may be automatically displayed on the user device overlaid or next to the object. In some implementations, the measurements may be provided after some type of user interaction with the identified object. For example, the user may be shown a transparent bounding box surrounding an object, and the user may select or click on the bounding box and the measurements would then be displayed.

Figure 6A:
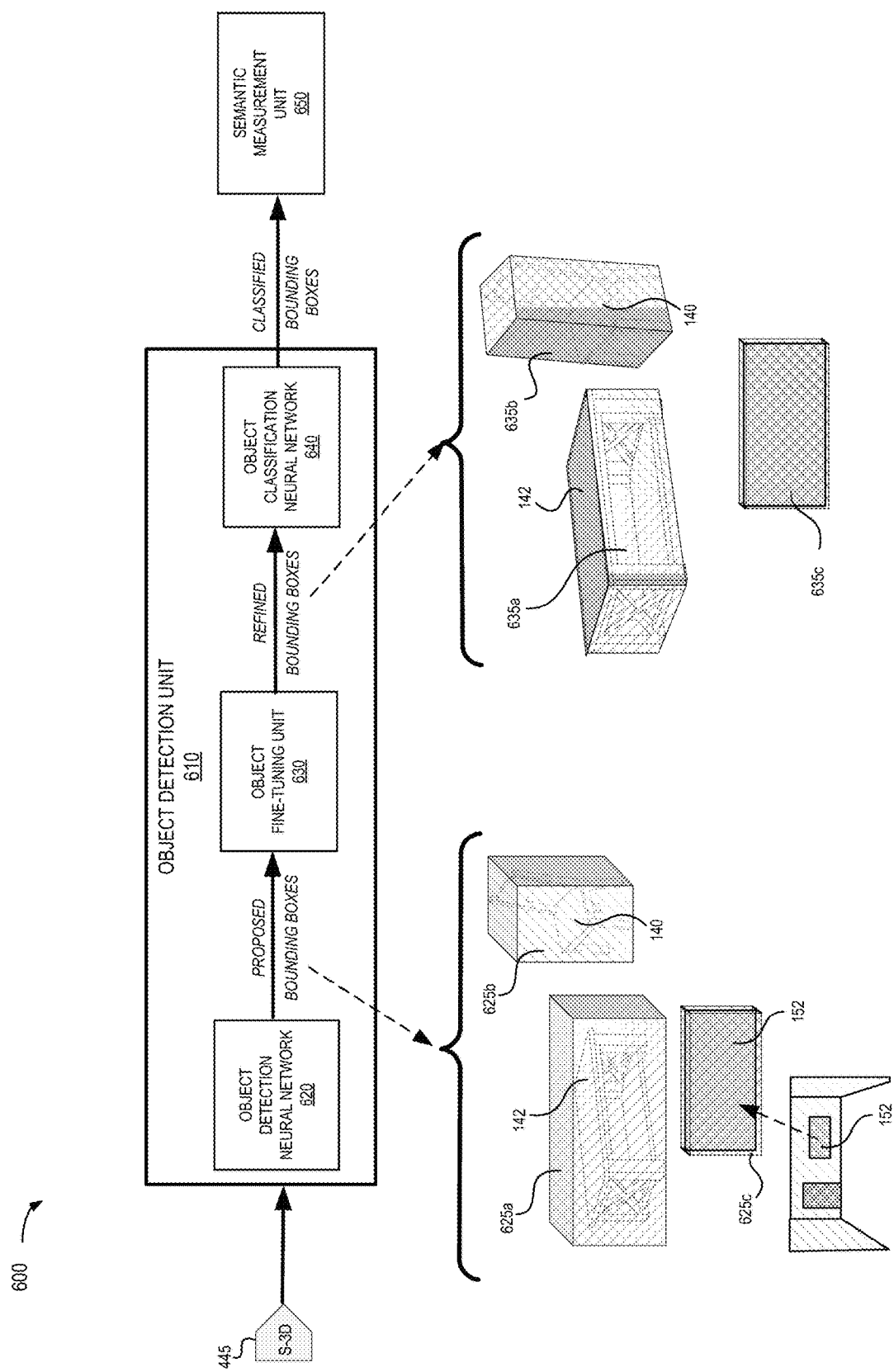
FIGS. 6A-6B are system flow diagrams of an example generation of a measurement of an object determined using one of a plurality of class-specific neural networks of a physical environment based on a 3D representation of the physical environment according to some implementations.
Figure 6B:
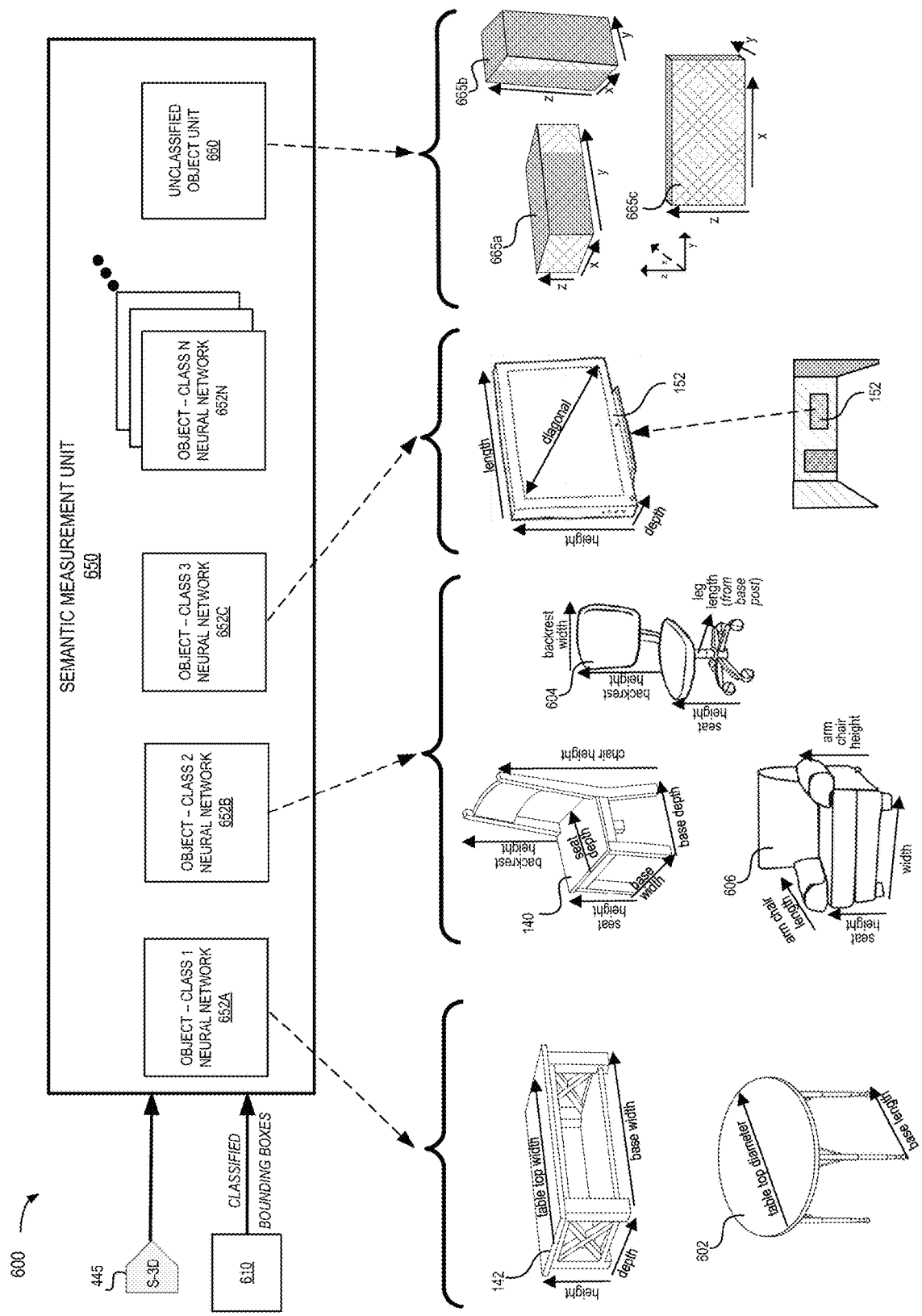

FIGS. 6A-6B are system flow diagrams of an example environment 600 in which a system can generate and provide measurement data for objects within a physical environment based on a 3D representation (e.g., a 3D point cloud, a 3D mesh reconstruction, a semantic 3D point cloud, etc.) of the physical environment. In some implementations, the system flow of the example environment 600 is performed on a device (e.g., server 110 or device 120 of FIGS. 1-3), such as a mobile device, desktop, laptop, or server device. The system flow of the example environment 600 can be displayed on a device (e.g., device 120 of FIGS. 1 and 3) that has a screen for displaying images and/or a screen for viewing stereoscopic images such as a head-mounted display (HMD). In some implementations, the system flow of the example environment 600 is performed on processing logic, including hardware, firmware, software, or a combination thereof. In some implementations, the system flow of the example environment 600 is performed on a processor executing code stored in a non-transitory computer-readable medium (e.g., a memory).

The system flow of the example environment 600 acquires a semantic 3D representation (e.g., semantic 3D representation 445) from the semantic 3D unit 440, and other sources of physical environment information (e.g., camera positioning information) at the object detection unit 610 (e.g., object detection unit 244 of FIG. 2, and/or object detection unit 344 of FIG. 3). Some implementations of the present disclosure may include a SLAM system or the like. The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

The object detection unit 610 includes an object detection neural network 620, an object fine-tuning unit 630, and an object classification neural network 640. The system flow of the example environment 600 begins where the object detection unit 610 acquires a semantic 3D representation (e.g., semantic 3D representation 445), which includes 3D data of identified objects (e.g., semantic labels at the pixel or voxel level), at the object detection neural network 620 which generates proposed bounding boxes 625a, 625b, and 625c of the identified objects (e.g., table 142, chair 140, and TV 152, respectively). The proposed bounding boxes 625a, 625b, and 625c are then refined by the object fine-tuning unit 630. The object fine-tuning unit 630 acquires the semantic 3D representation 445 data and the proposed bounding boxes 625a, 625b, and 625c, and generates refined bounding boxes. Bounding boxes may be refined using an inflate and cut technique. In some implementations, generating a refined 3D bounding box includes generating a proposed 3D bounding box for an object using a first neural network and generating the refined 3D bounding box by inflating the proposed 3D bounding box based on a bounding box inflation scale (e.g., inflate the bounding box by 10%), identifying features of the object of the inflated proposed bounding box using a second neural network, and refining the bounding box based on the identified features. In some implementations, the first neural network generates the proposed bounding box based on the 3D semantic data associated with the object. In some implementations, the second neural network identifies the features of the object based on the 3D semantic data associated with the object. In some implementations, a third neural network is trained to refine the accuracy of the identified features from the second neural network and output a refined bounding box based on the 3D semantic data associated with the object and light intensity image data (e.g., RGB data) obtained during the scanning process. The object fine-tuning unit 630 outputs refined bounding boxes 635a, 635b, and 635c (e.g., table 142 chair 140, and TV 152, respectively). As illustrated in FIG. 6A, the refined bounding boxes 635a, 635b, and 635c are more accurate than the bounding boxes 625a, 625b, and 625c, respectively (e.g., refined bounding box edges are closer to the surfaces of the objects than the initially proposed bounding boxes).

The refined bounding boxes 635a, 635b, and 635c are then sent to the object classification neural network 640 which classifies the objects and associated bounding boxes based on the 3D semantic data. In some implementations, the object classification neural network 640 classifies each object into subclasses. For example, the 3D semantic data labels particular points at the pixel or voxel level as a chair, and the classification neural network 640 can be trained to determine what type of chair or what features the chair has (e.g., an arm rest, the number of legs, a square or round seat, etc.). The object classification neural network 640 then outputs the classified objects and bounding box data to the semantic measurement unit 650, as further illustrated in FIG. 6B.

The semantic measurement unit 650 (e.g., measurement unit 246 of FIG. 2, and/or measurement unit 346 of FIG. 3) obtains the classified bounding boxes and the semantic 3D data (e.g., semantic 3D representation 445) and generates measurements (e.g., arm length, seat height, TV diameter, etc.) for the objects. The measurement data of the objects is determined using one of a plurality of class-specific neural networks: object—class 1 neural network 652A, object—class 2 neural network 652B, object—class 1 neural network 652C, object—class N neural network 652N (generally referred to herein as object—class neural networks 652). For example, a first network (e.g., object—class 1 neural network 652A) is trained to determine specific points on a table that are used for table measurements. For example, table 142 is an example coffee table, and particular measurements such as height, depth, base width, and table top width, may be determined and provided. Alternatively, table 602 is an example round table such that the tables table top diameter would be an alternative measurement that is determined that would not be applicable to table 142. Other tables may require additional measurements (e.g., a single leg table in the center with multiple feet or legs at the base). A second network (e.g., object—class 2 neural network 652B) is trained to determine different specific points on a chair that are used for chair measurements based on the subclass of chair. For example, chair 140 is an example dining room or kitchen chair without arms, and particular measurements such as seat height, base depth, base width, seat depth, total chair height, and backseat height, etc. may be determined and provided. Alternatively, chair 604 is an example office chair with one center post and five feet or legs such that the leg length from the post could be an alternative measurement that is determined that would not be applicable to chair 140. Alternatively, chair 606 is an example love seat (e.g., a chair with arms) such that the measurements regarding the arms of the chair could be alternative measurements that are determined that would not be applicable to chair 140 (e.g., arm chair length, arm chair height, etc.). Other chair types may require additional measurements. A third network (e.g., object—class 3 neural network 652C) is trained to determine different specific points on a TV (e.g., TV 152) that are used for TV measurements based on the subclass of TV. For example, a TV screen is typically measured diagonally, such that object—class 3 neural network 652C is trained to detect and provide the diagonal measurement with the standard depth, length, and height measurements (e.g., typical bounding box measurement information).

The semantic measurement unit 650 further includes an unclassified object unit 660 that provides measurements for objects that include a bounding box, but do not have a class specific neural network that generates specific measurements for the object. The semantic measurement unit 650 would provide the x, y, and z measurements (e.g., height, length, and width) for each received bounding box 665a, 665b, and 665c, etc. For example, some objects, such as a small appliance (e.g., a toaster), may not require the specificity of different measurements other than the measurements a bounding box provides.

The number of object class specific networks are not limited to the examples provided herein, and may include any number of classified objects that may need specified measurements. For example, every type of appliance, furniture, or other objects (e.g., a lamp, a gaming console, etc.) found in a physical environment may require a specific object—class neural network 652. Additionally, each object—class neural network 652 may be trained to identify any number of measurements, and not limited to the measurements illustrated in FIG. 6B.

In use, a user may scan a room with a device (e.g., a smartphone) and the processes described herein for the system flow of the example environment 600 would identify an object (e.g., a chair), and provide one or more specific measurements for the object (e.g., chair height, seat height, based width, etc.). In some implementations, the measurement data may be automatically displayed on the user device overlaid or next to the object. In some implementations, the measurement data may be provided after some type of user interaction with the identified object. For example, the user may be shown a transparent bounding box surrounding an object, and the user may select or click on the bounding box and the measurements would then be displayed.

Figure 7:
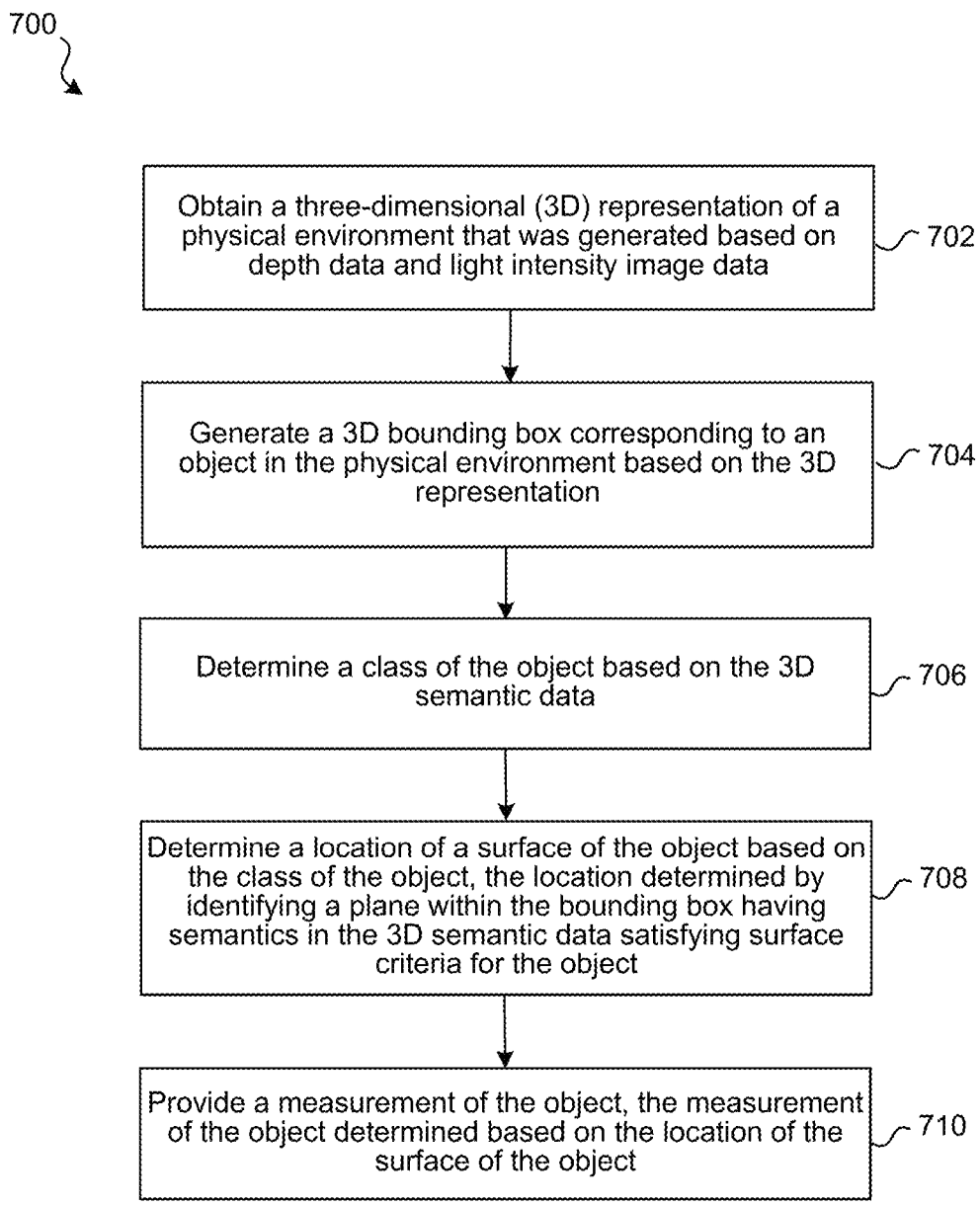
FIG. 7 is a flowchart representation of an exemplary method that generates and provides measurements of objects determined based on the location of the surface in accordance with some implementations.

FIG. 7 is a flowchart representation of an exemplary method 700 that provides measurement data for objects within a physical environment. In some implementations, the method 700 is performed by a device (e.g., server 110 or device 120 of FIGS. 1-3), such as a mobile device, desktop, laptop, or server device. The method 700 can be performed on a device (e.g., device 120 of FIGS. 1 and 3) that has a screen for displaying images and/or a screen for viewing stereoscopic images such as a head-mounted display (HMD). In some implementations, the method 700 is performed by processing logic, including hardware, firmware, software, or a combination thereof. In some implementations, the method 700 is performed by a processor executing code stored in a non-transitory computer-readable medium (e.g., a memory). The object measurement data creation process of method 700 is illustrated with reference to FIG. 8.

At block 702, the method 700 obtains a 3D representation of a physical environment that was generated based on depth data and light intensity image data. For example, a user captures video while walking around the room to capture images of different parts of the room from multiple perspectives. The depth data can include pixel depth values from a viewpoint and sensor position and orientation data. In some implementations, the depth data is obtained using one or more depth cameras. For example, the one or more depth cameras can acquire depth based on structured light (SL), passive stereo (PS), active stereo (AS), time-of-flight (ToF), and the like. Various techniques may be applied to acquire depth image data to assign each portion (e.g., at a pixel level) of the image. For example, voxel data (e.g., a raster graphic on a 3D grid, with the values of length, width, and depth) may also contain multiple scalar values such as opacity, color, and density. In some implementations, depth data is obtained from sensors or 3D models of the content of an image. Some or all of the content of an image can be based on a real environment, for example, depicting the physical environment 105 around the device 120. Image sensors may capture images of the physical environment 105 for inclusion in the image and depth information about the physical environment 105. In some implementations, a depth sensor on the device 120 (e.g., depth camera 402) determines depth values for voxels that are determined based on images captured by an image sensor on the device 120. The physical environment 105 around the user may be 3D modeled (e.g., 3D point cloud 424) based on one or more values and subsequent depths of objects depicted in subsequent images of the physical environment can be determined based on the model and camera position information (e.g., SLAM information).

At block 704, the method 700 generates a 3D bounding box corresponding to an object in the physical environment based on the 3D representation. For example, the 3D bounding box may provide location, pose (e.g., orientation and location), and shape of a particular piece of furniture or appliance in the room. Bounding boxes may be refined using RGB data and novel multi-network adjustment techniques (e.g., neural network based machine learning models for fine-tuning). Bounding boxes may be refined using an inflate and cut technique. In some implementations, generating a refined 3D bounding box includes generating a proposed 3D bounding box for an object using a first neural network and generating the refined 3D bounding box by inflating the proposed 3D bounding box based on a bounding box inflation scale (e.g., inflate the bounding box by 10%), identifying features of the object of the inflated proposed bounding box using a second neural network, and refining the bounding box based on the identified features. In some implementations, the first neural network generates the proposed bounding box based on the 3D semantic data associated with the object. In some implementations, the second neural network identifies the features of the object based on the 3D semantic data associated with the object. In some implementations, a third neural network is trained to refine the accuracy of the identified features from the second neural network and output a refined bounding box based on the 3D semantic data associated with the object and light intensity image data (e.g., RGB data) obtained during the scanning process.

At block 706, the method 700 determines a class of the object based on the 3D semantic data. For example, providing a class designation or label for each generated 3D bounding box. For data points that are labeled as a chair in the 3D semantic data, then the 3D bounding box would be labeled as a chair. In some implementations, classifying an object based on the 3D semantic data includes determining, based on the 3D semantic data, a class of the 3D bounding box using an object classification neural network, and classifying the object corresponding to the 3D bounding box based on the classification of the 3D bounding box.

At block 708, the method 700 determines a location of a surface of the object based on the class of the object, the location determined by identifying a plane within the 3D bounding box having semantics in the 3D semantic data satisfying surface criteria for the object. The location is determined by identifying a plane within the 3D bounding box having semantics in the 3D semantic data satisfying surface criteria for the object. For example, identifying that a large number of chair voxels are within a horizontal plane indicates that the horizontal plane is the seat surface of a chair type object.

At block 710, the method 700 provides a measurement of the object. The measurement of the object is determined based on the location of the surface of the object determined at block 708. For example, a measurement may be acquired from the seat surface to the floor to provide a seat height measurement. For example, a user may scan a room with a device (e.g., a smartphone) and the processes described herein would identify an object (e.g., a chair), and provide measurements for the identified object (e.g., seat height, etc.).

In some implementations, identifying a plane within a 3D bounding box comprises identifying that the plane is a surface of a particular feature (e.g., chair seat) of a type of the object based on a number of 3D data points (e.g., voxels) being within the plane (e.g., horizontal). In some implementations, identifying that the plane is a surface of a particular feature (e.g., chair seat) of a type of the object is based on a number of 3D data points (e.g., voxels) being within the plane (e.g., horizontal) is determined based on a comparison to a data point plane threshold. For example, a data point plane threshold is a particular number of data points. In some implementations, a plane threshold is a percentage of data points compared to the other data points that are semantically labeled. For example, if 30% or more points are on the same horizontal plane (i.e., same height level), then it can be determined that a detected horizontal plane is the seat of a chair. In some implementations, different threshold percentages could be used for other object classifications. For example, tables would have a higher percentage of data points on the same horizontal plane. In some implementations, different detected planes may be used and compared to determine different features of identified objects.

In use, a user may scan a room with a device (e.g., a smartphone) and the processes described herein for method 700 would identify an object (e.g., a chair), and provide specific measurements for the object (e.g., chair height, seat height, based width, etc.). In some implementations, the measurements may be automatically displayed on the user device overlaid or next to the object. In some implementations, the measurements may be provided after some type of user interaction with the identified object. For example, the user may be shown a transparent bounding box surrounding an object, and the user may select or click on the bounding box and the measurements would then be displayed.

FIG. 8 is a system flow diagram of an example environment 800 in which a system can generate and provide measurement data for objects within a physical environment based on a 3D representation (e.g., a 3D point cloud, a 3D mesh reconstruction, a semantic 3D point cloud, etc.) of the physical environment. In some implementations, the system flow of the example environment 800 can be displayed on a device (e.g., device 120 of FIGS. 1 and 3) that has a screen for displaying images and/or a screen for viewing stereoscopic images such as a head-mounted display (HMD). In some implementations, the system flow of the example environment 800 is performed on processing logic, including hardware, firmware, software, or a combination thereof. In some implementations, the system flow of the example environment 800 is performed on a processor executing code stored in a non-transitory computer-readable medium (e.g., a memory).

The system flow of the example environment 800 acquires a semantic 3D representation (e.g., semantic 3D representation 445) from the semantic 3D unit 440, and other sources of physical environment information (e.g., camera positioning information) at the object detection unit 810 (e.g., object detection unit 244 of FIG. 2, and/or object detection unit 344 of FIG. 3). The object detection unit 810 includes an object detection neural network 820, an object fine-tuning unit 830, and an object classification neural network 840.

The system flow of the example environment 800 begins where the object detection unit 810 acquires a semantic 3D representation (e.g., semantic 3D representation 445), which includes 3D data of identified objects (e.g., semantic labels at the pixel or voxel level), at the object detection neural network 820 which generates proposed bounding box 825 of the identified objects (e.g., chair 140). The proposed bounding box 825 is then refined by the object fine-tuning unit 830. The object fine-tuning unit 830 acquires the semantic 3D representation 445 data and the proposed bounding box 825 and generates a refined bounding box 835. Bounding boxes may be refined using an inflate and cut technique as described herein. The object fine-tuning unit 630 outputs a refined bounding box 835 associated with chair 140. As illustrated in FIG. 8, the refined bounding box 835 is more accurate (e.g., closer to the surfaces of the chair 140) than the bounding box 825.

The refined bounding box 835 is then sent to the object classification neural network 840 which classifies the objects and associated bounding boxes based on the 3D semantic data. In some implementations, the object classification neural network 840 classifies each object into subclasses. For example, the 3D semantic data labels particular points at the pixel or voxel level as a chair, and the classification neural network 840 can be trained to determine what type of chair or what features the chair has (e.g., an arm rest, the number of legs, a square or round seat, etc.). The object classification neural network 840 then outputs the classified objects and bounding box data to the semantic measurement unit 850.

The semantic measurement unit 850 (e.g., measurement unit 246 of FIG. 2, and/or measurement unit 346 of FIG. 3)

obtains the classified bounding boxes and the semantic 3D data (e.g., semantic 3D representation 445) and generates measurements (e.g., seat height, TV diameter, etc.) for the objects. The measurement data of the objects is determined by determining a location of a surface of the object based on the class of the object. The location is determined by identifying a plane within the bounding box having semantics in the 3D semantic data satisfying surface criteria for the object. For example, identifying that a large number of chair pixels or voxels are within a horizontal plane indicates that the plane is likely the seat surface of a chair type object. As illustrated in FIG. 8, a large number of semantically labeled 3D points for chair 140 are on a horizontal plane 852 (e.g., the x,y coordinates are spread out on the horizontal plane 852, but each includes a similar z height). The semantic measurement unit 850 determines that horizontal plane 852 is the seat of chair 140 based on the global coordinates of the 3D semantic data, as opposed to using additional neural networks to train a model to determine the chair seat using techniques described herein (e.g., object—class neural networks 652 in FIG. 6).

The semantic measurement unit 650 may further provide measurements for objects based on the associated bounding box information. The semantic measurement unit 650 would provide the x, y, and z measurements (e.g., height, length, and width) for each received bounding box. For example, the refined bounding box 835 would provide the overall height, base width, and base depth for the chair 140.

In some implementations, the image composition pipeline may include virtual content (e.g., a virtual box placed on the table 135 in FIG. 1) that is generated for an extended reality (XR) environment. In some implementations, the operating systems 230, 330 includes built in XR functionality, for example, including a XR environment application or viewer that is configured to be called from the one or more applications 240, 340 to display a XR environment within a user interface. For example, the systems described herein may include a XR unit that is configured with instructions executable by a processor to provide a XR environment that includes depictions of a physical environment including real physical objects and virtual content. A XR unit can generate virtual depth data (e.g., depth images of virtual content) and virtual intensity data (e.g., light intensity images (e.g., RGB) of the virtual content). For example, one of the applications 240 for the server 110 or applications 340 for the device 120 could include a XR unit that is configured with instructions executable by a processor to provide a XR environment that includes depictions of a physical environment including real objects or virtual objects. The virtual objects may be positioned based on the detection, tracking, and representing of objects in 3D space relative to one another based on stored 3D models of the real objects and the virtual objects, for example, using one or more of the techniques disclosed herein.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at an electronic device having a processor:
obtaining a three-dimensional (3D) representation of a physical environment that was generated based on depth data and light intensity image data, wherein the 3D representation is associated with 3D semantic data;
generating a 3D bounding box corresponding to an object in the physical environment based on the 3D representation;
determining a class of the object based on the 3D semantic data;
determining a planar surface characteristic associated with the class;
determining a location of a surface of the object based on the planar surface characteristic associated with the class, the location determined by identifying a plane within the 3D bounding box having semantics in the 3D semantic data satisfying surface criteria for the object; and
providing a measurement of the object, the measurement of the object determined based on the location of the surface of the object.

2. The method of claim 1, wherein determining a class of the object based on the 3D semantic data comprises:
determining, based on the 3D semantic data, a class of the 3D bounding box using an object classification neural network; and
classifying the object corresponding to the 3D bounding box based on the classification of the 3D bounding box.

3. The method of claim 1, wherein identifying a plane within the 3D bounding box comprises identifying that the plane is a surface of a particular feature of a type of the object based on a number of 3D data points being within the plane.

4. The method of claim 3, wherein identifying that the plane is a surface of a particular feature of a type of the object based on a number of 3D data points being within the plane is determined based on a comparison to a data point plane threshold.

5. The method of claim 1, wherein the 3D bounding box is a refined 3D bounding box, wherein generating a refined 3D bounding box comprises:
generating a proposed 3D bounding box for an object using a first neural network; and
generating the refined 3D bounding box by
inflating the proposed 3D bounding box based on a bounding box inflation scale,
identifying features of the object of the inflated proposed 3D bounding box using a second neural network, and
refining the proposed 3D bounding box based on the identified features.

6. The method of claim 5, wherein the first neural network generates the proposed 3D bounding box based on the 3D semantic data associated with the object.

7. The method of claim 5, wherein the second neural network identifies the features of the object based on the 3D semantic data associated with the object.

8. The method of claim 5, wherein a third neural network is trained to:
refine the accuracy of the identified features from the second neural network based on the 3D semantic data associated with the object and light intensity image data; and
output a further refined 3D bounding box based on the refined accuracy of the identified features from the second neural network.

9. The method of claim 1, wherein the 3D bounding box provides a location, an orientation, and a shape of an identified object.

10. The method of claim 1, wherein the 3D representation comprises a 3D point cloud and the associated 3D semantic data includes semantic labels associated with at least a portion of 3D points within the 3D point cloud.

11. The method of claim 10, wherein the semantic labels identify walls, wall attributes, objects, and classifications of the objects of the physical environment.

12. The method of claim 1, wherein the class of the object is selected from a plurality of classes associated with different planar surface characteristics.

13. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the device to perform operations comprising:
obtaining a three-dimensional (3D) representation of a physical environment that was generated based on depth data and light intensity image data, wherein the 3D representation is associated with 3D semantic data;
generating a 3D bounding box corresponding to an object in the physical environment based on the 3D representation;
determining a class of the object based on the 3D semantic data;
determining a planar surface characteristic associated with the class;
determining a location of a surface of the object based on the planar surface characteristic associated with the class, the location determined by identifying a plane within the 3D bounding box having semantics in the 3D semantic data satisfying surface criteria for the object; and
providing a measurement of the object, the measurement of the object determined based on the location of the surface of the object.

14. The device of claim 13, wherein determining a class of the object based on the 3D semantic data comprises:
determining, based on the 3D semantic data, a class of the 3D bounding box using an object classification neural network; and classifying the object corresponding to the 3D bounding box based on the classification of the 3D bounding box.

15. The device of claim 13, wherein identifying a plane within the 3D bounding box comprises identifying that the plane is a surface of a particular feature of a type of the object based on a number of 3D data points being within the plane.

16. The device of claim 15, wherein identifying that the plane is a surface of a particular feature of a type of the object based on a number of 3D data points being within the plane is determined based on a comparison to a data point plane threshold.

17. The device of claim 13, wherein the 3D bounding box is a refined 3D bounding box, wherein generating a refined 3D bounding box comprises:
  generating a proposed 3D bounding box for an object using a first neural network; and
  generating the refined 3D bounding box by
    inflating the proposed 3D bounding box based on a bounding box inflation scale,
    identifying features of the object of the inflated proposed 3D bounding box using a second neural network, and
    refining the proposed 3D bounding box based on the identified features.

18. The device of claim 17, wherein the first neural network generates the proposed 3D bounding box based on the 3D semantic data associated with the object.

19. The device of claim 17, wherein the second neural network identifies the features of the object based on the 3D semantic data associated with the object.

20. The device of claim 17, wherein a third neural network is trained to:
  refine the accuracy of the identified features from the second neural network based on the 3D semantic data associated with the object and light intensity image data; and
  output a further refined 3D bounding box based on the refined accuracy of the identified features from the second neural network.

21. A non-transitory computer-readable storage medium, storing program instructions computer-executable on a computer to perform operations comprising:
  obtaining a three-dimensional (3D) representation of a physical environment that was generated based on depth data and light intensity image data, wherein the 3D representation is associated with 3D semantic data;
  generating a 3D bounding box corresponding to an object in the physical environment based on the 3D representation;
  determining a class of the object based on the 3D semantic data;
  determining a planar surface characteristic associated with the class;
  determining a location of a surface of the object based on the planar surface characteristic associated with the class, the location determined by identifying a plane within the 3D bounding box having semantics in the 3D semantic data satisfying surface criteria for the object; and
  providing a measurement of the object, the measurement of the object determined based on the location of the surface of the object.

* * * * *